United States Patent [19]

Szymozak et al.

[11] Patent Number: 4,869,319
[45] Date of Patent: Sep. 26, 1989

[54] WELLHEAD STRUCTURE

[75] Inventors: Edward J. Szymozak, Spring; Thomas G. Cassity, Katy; William M. Taylor, Houston, all of Tex.; Peer H. Tiemer, Hambuehren, Fed. Rep. of Germany; Larry M. Hoes, Spring; Jerry D. Smith, Houston, both of Tex.; Timothy C. Davies, Leeds, England

[73] Assignee: Cameron Iron Works USA, Inc., Houston, Tex.

[21] Appl. No.: 136,986

[22] Filed: Dec. 23, 1987

[30] Foreign Application Priority Data

Nov. 11, 1987 [GB] United Kingdom ................. 8726356

[51] Int. Cl.⁴ .......................................... E21B 33/04
[52] U.S. Cl. ..................................... 166/115; 166/85; 166/208; 285/140; 285/382.5
[58] Field of Search ................................ 166/206–208, 166/75.1, 85, 115; 285/140–143, 382.5; 29/523

[56] References Cited

U.S. PATENT DOCUMENTS

| | | | |
|---|---|---|---|
| 2,134,311 | 10/1938 | Minor et al. | 285/140 X |
| 2,920,909 | 1/1960 | Allen | 285/146 |
| 3,311,168 | 3/1967 | Pierce, Jr. | 166/89 |
| 3,432,916 | 3/1969 | Fisher et al. | 29/516 |
| 3,434,194 | 3/1969 | Whittaker et al. | 29/523 X |
| 3,561,527 | 2/1971 | Nelson | 166/86 |
| 3,797,864 | 3/1974 | Hymes et al. | 285/140 |
| 4,330,144 | 5/1982 | Ridenout | 285/382.5 |
| 4,388,752 | 6/1983 | Vineiguerra et al. | 285/382.5 X |
| 4,662,663 | 5/1987 | Schmitz | 285/382.5 |
| 4,749,047 | 6/1988 | Taylor | 166/208 X |

Primary Examiner—Hoang C. Dang

[57] ABSTRACT

The improved wellhead structure of the present invention includes a casing or tubing string which is sealed to the housing without the aid of elastomeric seals and an internal bushing to assist in providing the tight gripping and sealing engagement between the string and the housing. The structure provides a substantial inner diameter which is unrestricted unless landing shoulder is included in the structure. Also, the internal bushing used with the cold forging of the string into the housing recess improves the gripping and sealing engagement therebetween. In one form the bushing includes a series of external projections which alternate with the gripping and sealing projections within the housing recess and in another form includes a resilient annulus between the interior of the bushing and the string to ensure the uniform application of pressure against the interior of the string. In still another form an internal landing shoulder is cold forged into tight engagement with the interior of the housing which allows full bore operations to be carried through the housing until the landing shoulder is to be installed. Also provided is a wellhead structure with a tieback structure in which the upper end of the casing is cold forged into the interior of a hanger while the casing is supported on slips.

17 Claims, 5 Drawing Sheets

WELLHEAD STRUCTURE

BACKGROUND

The present invention relates to an improved wellhead structure and to the method of assembling such structure. Compact wellheads have been used to provide a suspension and sealing system for casing and tubing strings from a single head which reduces the stack-up height and reduces the number of connections required. Also, with such compact wellhead the blowout preventer stack is not removed during installation of the casing and tubing. Normally, with the use of such compact heads, the last string of pipe with the casing hangers attached is run into the well and the casing hangers are landed rather than using slips to support a casing string and cutting the string for the installation of a hanger thereon. This system would utilize the slips for support and the elastomeric seals to provide the annulus seal.

Some hangers have utilized slips to engage and support the well string. U.S. Pat. Nos. 2,920,909 and 3,311,168 disclose such structure. Other hangers have had an external shoulder which is adapted to seat on an internal housing seat, such as is shown in U.S. Pat. Nos. 3,561,527 and 3,797,864. Such hangers are provided normally with external threads on their lower ends and have their well strings threaded thereon.

In the past it has been known that a portion of a remote connector could be remotely cold formed onto the end of a subsea pipeline so that a repair section would be connected to the existing pipeline. Examples of cold forming are shown in U.S. Pat. Nos. 3,432,916, 4,330,144; and 4,388,752. 4,662,663 suggests the use of a material within the grooves to compensate for any build-up of pressure therein during forming. U.S. Pat. No. 2,134,311 discloses the roll forging of the upper end of a string into grooves within the interior of casing head to support and seal the upper end of the string therein.

Reference is also made to copending application Serial No. 07/044,409, filed Apr. 30, 1987, now continuation application Ser. No. 07/217,376, filed July 11, 1988, which discloses the securing of a tubular member within an annular well member in a cold forging operation.

SUMMARY

The present invention relates to an improved wellhead structure in which a casing or tubing string is sealed to the housing without the aid of elastomeric seals and includes an internal bushing to assist providing in the tight gripping and sealing engagement between the string and the housing and provides a substantial inner diameter which is unrestricted except for a landing shoulder included in the structure. Also, the internal bushing used in the cold forging of the string into the housing recess improves the gripping and sealing engagement therebetween. In one form the bushing includes a series of projections which alternate with the gripping and sealing projections within the housing recess and in another form includes a resilient annulus between the exterior of the bushing and the interior of the string to ensure the uniform application of pressure against the interior of the string and also permits retraction of the forging tool in instances where large casing is being forged into a housing with a restricted inner diameter. In still another form of the present invention, an internal landing shoulder is cold forged into tight engagement with the interior of the housing which allows full bore operations to be carried through the housing until the landing shoulder is to be used. In another form, the present invention relates to an improved wellhead structure in which a savings in height is accomplished without the loss of any sealing ability or the introduction of internal obstructions to the interior of the central bore through the casing. This structure is provided as a tieback structure in which the upper end of the casing is cold forged into the interior of a hanger adapted while the casing is being supported on slips and the adaptor is supported by the slip bowl.

An object of the present invention is to provide an improved wellhead structure in which the upper end of a string is cold forged to the housing with an internal member within the string which allows large diameter operations through the housing.

Another object is to provide an improved wellhead structure including a landing shoulder cold forged into the interior of the housing with substantial support between the landing shoulder and the housing for the support of load supported by the landing shoulder.

A further object is to provide an improved wellhead structure in which the pressure of the cold forging is uniformly exerted over the interior of the string which is being forged.

A still further object is to provide a wellhead structure in which the upper end of the casing is supported on a slip assembly which is supported by the housing landing shoulder and which reduces the vertical extent of the wellhead structure.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENTS

Figures 1, 2:
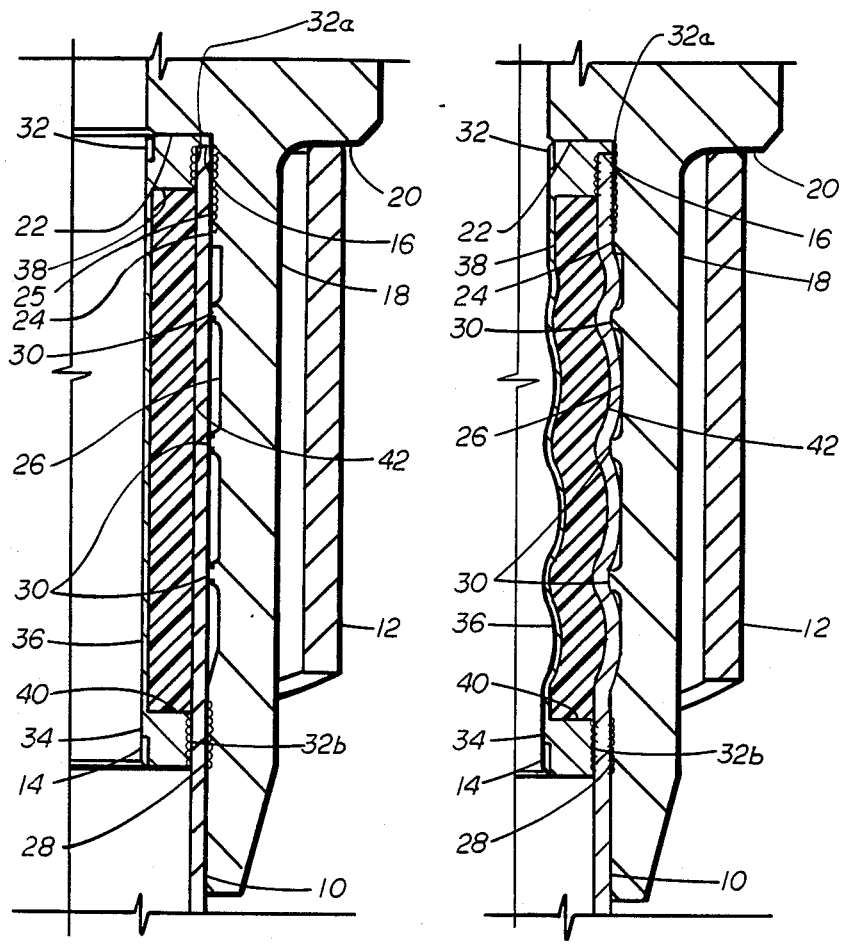
FIG. 1 is a partial longitudinal sectional view of one form of the improved wellhead structure of the present invention having an internal bushing which includes an external resilient insert for exerting the forging pressure uniformly over the interior of the string and also to permit retraction of the forging tool in instances where large casing is being forged into a housing with a restricted inner diameter.
FIG. 2 is a view similar to FIG. 1 but showing the structure after it has been cold forged.

As shown in FIG. 1, casing string 10 is positioned within outer well casing 12. Both strings 10 and 12 have been cemented within the well. Bushing 14 has been lowered to the position shown wherein its upper outwardly extending flange 16 is in engagement with the upper end of casing string 10 and its exterior surface is positioned within the casing string 10 as shown. Housing 18 has been lowered onto flange 16 of bushing 14 and the top of the outer well casing 12 and its depending portion is positioned in close surrounding relationship to the exterior of casing string 10 and its outer downwardly facing shoulder 20 is seated on the upper end of casing 12 while its inner downwardly facing shoulder 22 is seated on the upper surface of flange 16 of bushing 14.

The contour of the interior surface 24 of housing 18 immediately below shoulder 22 is serrated with teeth 25. Recess 26 is below surface 24 and ends in serrated teeth 28. Recess 26 includes lands 30 projecting inwardly.

Bushing 14 includes upper annular body portion 32 from which flange 16 extends outwardly, lower body portion 34 and inner body portion 36 extending between portions 32 and 34. Upper body portion forms upper downwardly facing shoulder 38 and lower body portion forms lower upwardly facing shoulder 40 with resilient annulus 42 positioned between shoulders 38 and 40. The exterior of upper body portion 32 includes sharp teeth 32a and the, exterior of lower body portion includes sharp teeth 32b as shown. When bushing 14 and housing 18 are landed, a suitable cold forging tool is lowered therein and pressurized to exert the cold forging pressure on the interior of bushing 14. This pressure is transmitted through inner body portion 36 to resilient annulus 42 and t the interior of casing 10 so that it is uniformly cold forged into recess 26 on the interior of casing 12 and thus into tight gripping -and sealing engagement with lands 30 and surfaces 24 and 28. The completed structure is illustrated in FIG. 2.

Figure 3:
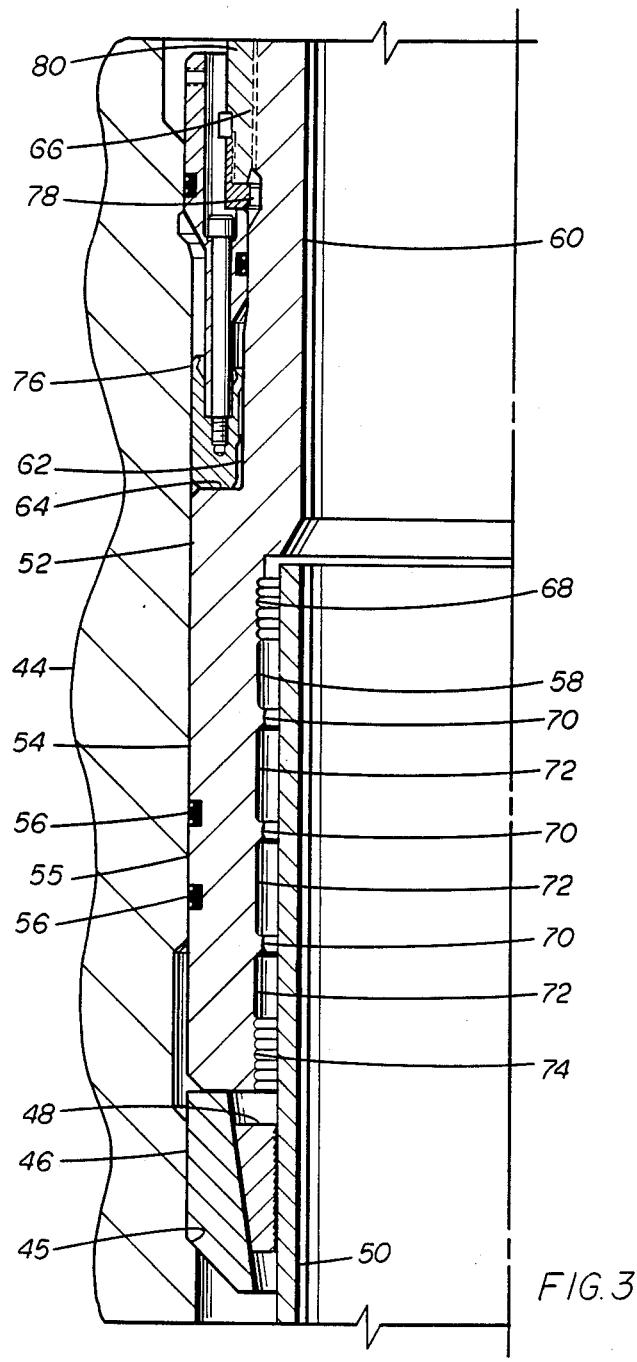
FIG. 3 is a partial longitudinal sectional view of another form of tieback wellhead structure in which the string is supported on slips while the hanger is lowered into surrounding relationship thereto.
Figure 4:
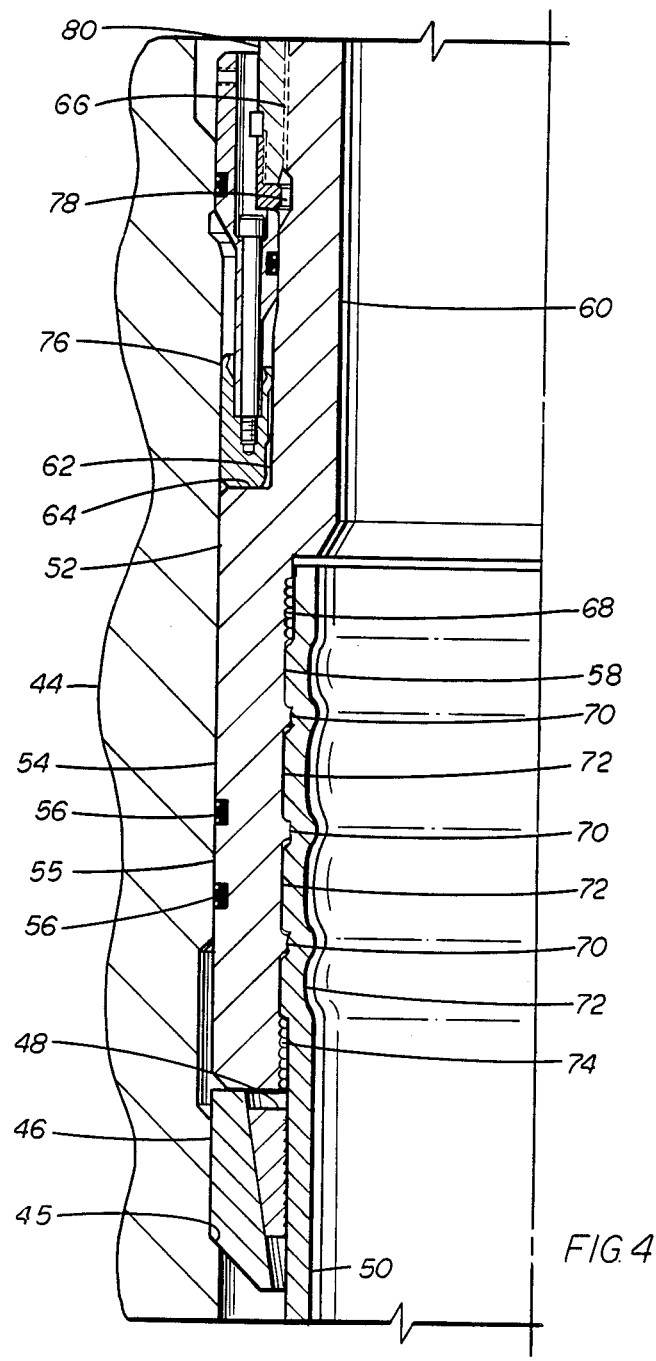
FIG. 4 is a similar partial sectional view of the structure shown in FIG. 3 after the cold forging of the upper end of the casing string to the sealing adapter.

A modified form of the invention as shown in FIGS. 3 and 4, discloses housing 44 which includes a generally cylindrical interior with upwardly facing landing shoulder 45. Slip bowl 46 is landed on landing shoulder 45 and its slips 48 are in gripping engagement with the exterior of the upper end of casing string 50. Annular adaptor 52 includes lower section 54 having cylindrical exterior surface 55 with suitable resilient seals 56 for sealing against the interior of housing 44 and lower recess 58 on its interior and upper section 60 having outer recess 62 which ends in upwardly facing shoulder 64 and external threads 66 at its upper end.

This contour of the interior of lower section 54 in recess 58 includes upper sharp teeth 68, intermediate lands 70 and grooves 72 and lower sharp teeth 74. Adaptor 52 is preferably positioned with metal-to-metal seal 76 and seal latch 78 in position within recess 62. Latch 78 and seal 76 are set by the downward movement of sleeve 80 which is in threaded engagement with external threads 66. It is generally considered proper procedure to set seal 76 and latch 78 after adaptor 52 has been landed and casing string 50 has been cold forged against the interior of recess 58 as hereinafter explained.

With the components in the position as shown in FIG. 3, a suitable forging tool (not shown) is lowered through adaptor 52 and the string (not shown) on which it is run into the interior of the upper end of casing string 50. The tool, when in proper position exerts sufficient radial outward pressure on the interior of casing string 50 so that it is deformed into tight sealing and gripping engagement with teeth 68 and 74 and with lands 70 so that any loading from casing string 50 or on adaptor 52 ,is transferred through slip bowl 48 to landing shoulder 45. The result of this deformation from radial cold forging of the upper end of casing string into its recess is illustrated in FIG. 4. In this configuration, the reduction the height of the wellhead structure is sufficient to be very advantageous.

Figure 5:
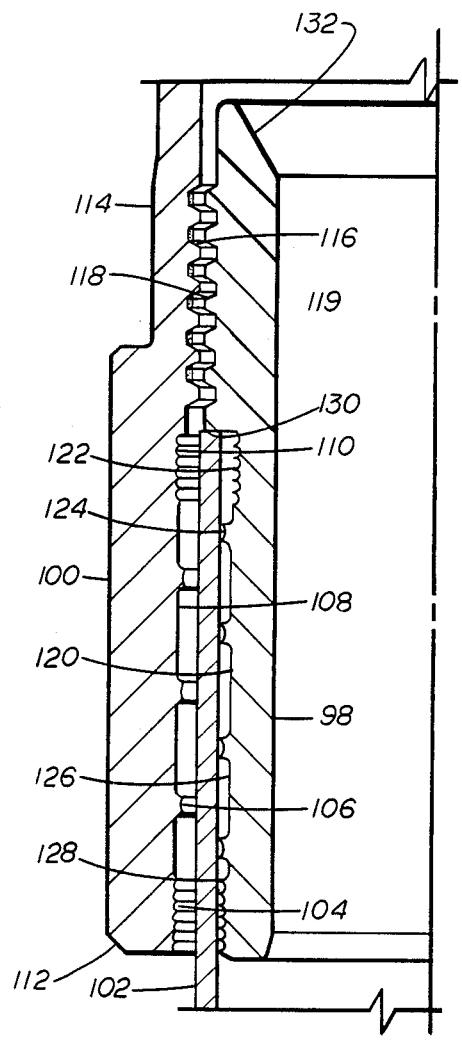
FIG. 5 is a partial longitudinal sectional view of another form of improved wellhead structure before the cold forging operation.
Figure 6:
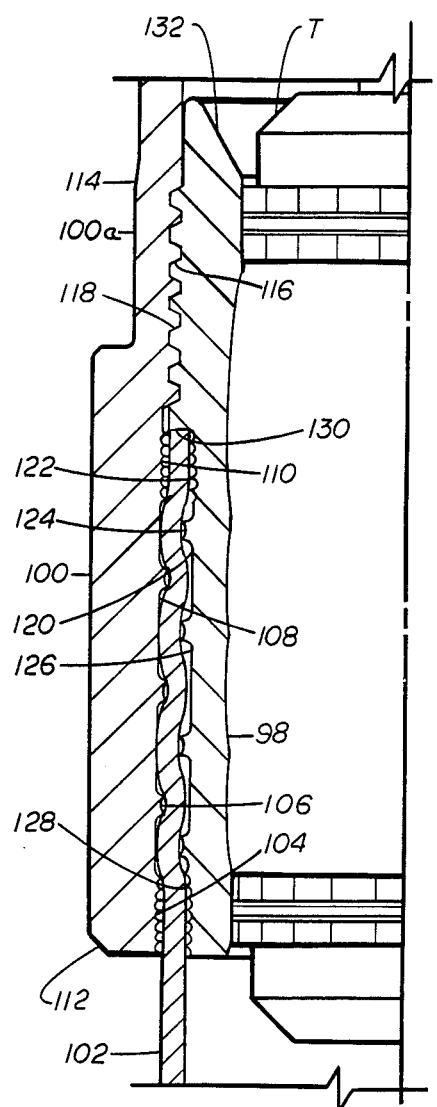
FIG. 6 is a view of the structure shown in FIG. 5 after the cold forging operation.

The modified structure shown in FIGS. 5 AND 6 provides a hanger 98 which is combined with housing 100 and the upper end of string 102 in the cold forging step. Housing 100 has a lower interior which includes lower sharp, closely spaced teeth 104, intermediate lands 106 and grooves 108 and upper sharp, closely spaced teeth 110. The upper end of string 102 is positioned slightly above upper teeth 110. The lower exterior of housing 100 includes tapered surface 112 which can be used for engagement with a landing shoulder (not shown). The upper exterior includes recess 114 in which a sealing means is to be positioned for sealing the annulus between the interior of the wellhead structure surrounding housing 100 and the exterior of housing 100. The upper interior portion of housing 100 includes heavy teeth 116 having repetitive profiles which are adapted to mate with teeth 118 on the exterior of hanger 98 upon completion of the cold forging step as hereinafter described. As shown in FIG. 5, volume compensating material 119 is positioned in the grooves between teeth 116 and 118 to avoid problems which can be encountered during the forging step as a result of well fluids being trapped in such grooves. Volume compensating material 119 is preferably microspheres in an epoxy matrix but can be any other suitable materials.

Hanger 98 includes a lower external recess 120 in which upper sharp, closely spaced teeth 122, intermediate lands 124 and grooves 126 and lower sharp, closely spaced teeth 128 are positioned. Shoulder 130 at the upper end of recess 120 faces downwardly and lands on the upper end of string 102 as shown. The position of lands 124 is carefully selected to be positioned during the cold forging step approximately mid way between lands :06 on the interior of housing 100. It is believed that this relative positioning of the two sets of lands provides an improved tighter gripping and sealing engagement between housing 100 and string 102 and between hanger 8 and string 102. The greater deformation of the cold forged portion of string 102 is shown in FIG. 6. Also, the cold forging step, as seen from FIG. 6 has forged hanger 98 outwardly so that its external teeth 118 are in tight gripping and supporting engagement with teeth 116 on the interior of housing 100. The upper end of hanger 98 is tapered upwardly and outwardly to form seat 132. The exterior of housing 100 includes sealing recess 114 in which suitable sealing means is positioned to provide a seal bridging the annular space between the exterior of recess 100a and the interior surface of the well member (not shown) surrounding housing 100.

Figures 7, 8:
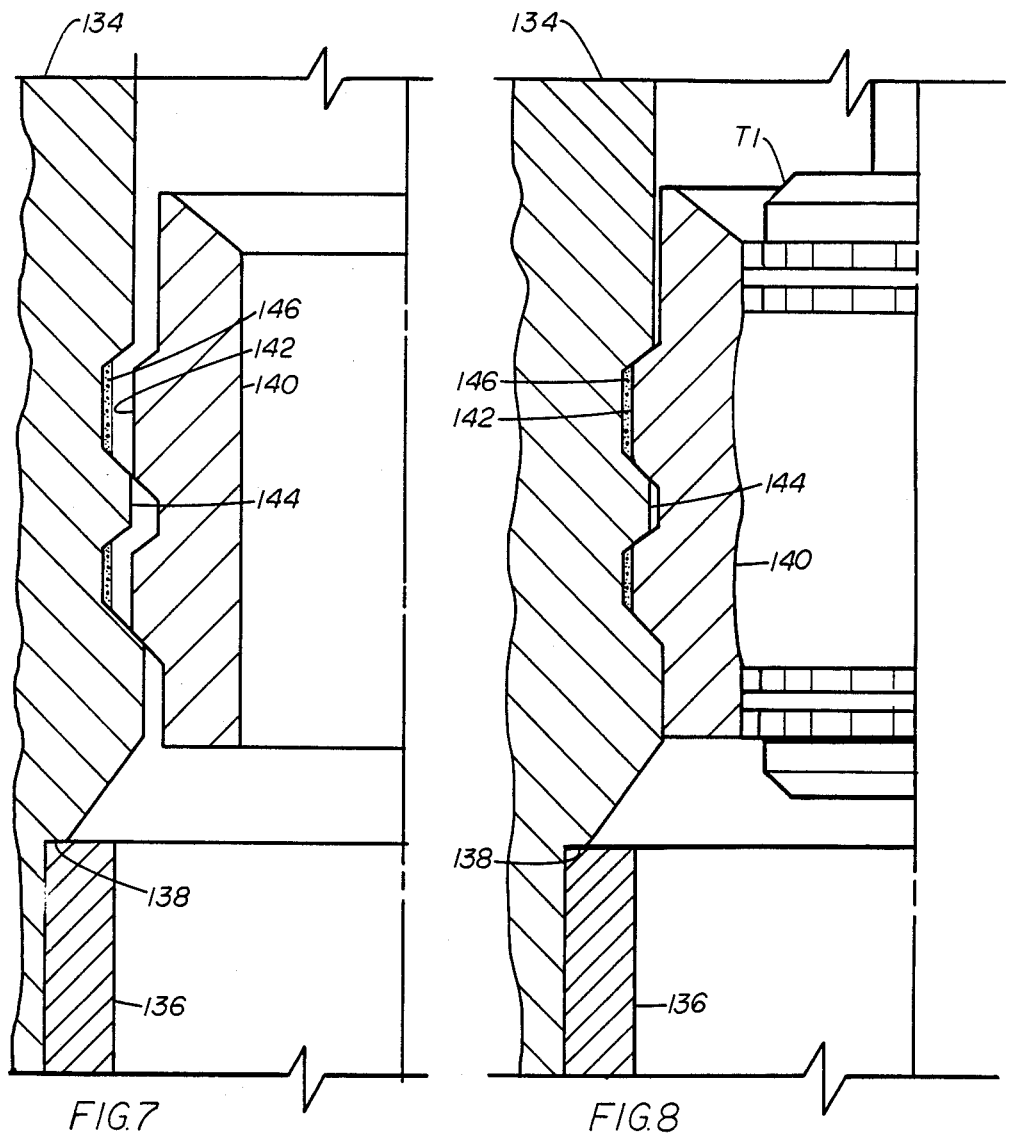
FIG. 7 is a partial longitudinal sectional view of another form of improved wellhead structure before cold forging.
FIG. 8 is a similar view of the structure of FIG. 7 after the cold forging has set the landing shoulder in position within the housing.

As shown in FIGS. 7 and 8, housing 134 is positioned in surrounding relationship to the upper portion of string 136 and its lower shoulder 138 has landed thereon. In this position full bore operations can also be continued through housing 134 until it is desired to provide the hanger shoulder on its interior for subsequent operations. At such time hanger ring 140 is lowered into position within housing 134 so that the heavy teeth 142 on its exterior surface are facing the heavy teeth 144 on the interior of housing 134 and ready for interengagement between such teeth. At such time the cold forging tool T1 is lowered into the position within hanger ring 140 and activated so that it cold forges hanger ring 140 into tight engagement with heavy teeth 144 on the interior of housing 134 so that it is fully supported in such position. Volume compensating material 146 is positioned in the grooves between heavy teeth 144 to avoid problems of having liquid trapped in the grooves during the cold forging step. Material 146 preferably has the same composition as material 119.

What is claimed is:

1. A wellhead structure comprising:
   a string within a well bore,
   a housing,
   means connecting the housing to the upper end of said string,
   said connecting means including
   a cold forged gripping and sealing engagement between the housing and string, and
   a bushing positioned within said string and being cold forged against said string.

2. A wellhead structure according to claim including means on said bushing for increasing the tightness of engagement between the housing and the string 3. A wellhead structure according to claim 2 including
   a resilient annulus carried by said bushing and transmitting the forging forces to the string.

4. A wellhead structure according to claim 2 wherein
   said housing includes a recess having lands and grooves for receiving and engaging said string, and
   said bushing includes lands and grooves which have preselected positions to engage the interior of the string at level mid way between the engagement of the lands of the housing on the exterior of the string.

5. A well head structure according to claim 2 wherein the inner diameter of said bushing after being cold forged with the string is not substantially greater than the inner diameter of the housing.

6. A wellhead structure according to claim 1 wherein said housing has a full bore, and
   said bushing provides a landing seat within said housing.

7. A wellhead structure comprising
   a string within a well bore,
   a housing,
   means connecting the housing to the upper end of said string,
   said connecting means including a cold forging of the string into tight gripping and sealing engagement with the housing, and
   said housing having a full bore,
   a landing seat ring positioned within said housing,
   said landing seat being cold forged into tight supporting engagement with the housing so that loads on said landing seat ring are transferred to said housing.

8. A wellhead structure according to claim 7 wherein said housing includes heavy interior teeth, and
   said landing seat ring includes heavy exterior teeth which are cold forged into supporting engagement within the teeth on said housing.

9. A wellhead structure according to claim wherein said landing seat ring is part of a bushing,
   said bushing is positioned within said string and is cold forged against said string as a part of the cold forging of the string to the housing.

10. A wellhead structure according to claim 9 wherein
    said bushing includes means for increasing the tightness of the gripping and sealing engagement between the string and the housing.

11. A wellhead structure according to claim 10 wherein said means increasing said engagement includes
    a resilient annulus positioned around the exterior of the bushing for engagement with the interior of the string to provide uniform transmission of forces during cold forging.

12. A wellhead structure according to claim 11 wherein
    said resilient annulus is positioned in a recess on the exterior of said bushing.

13. A wellhead structure according to claim 10 wherein said means increasing said engagement includes
    a plurality of lands and grooves on the exterior of the bushing which coact with lands and grooves on the interior of the housing to provide the tight gripping and sealing engagement between the string and the housing.

14. A wellhead structure comprising
    a housing having an internal upwardly facing landing seat,
    a slip assembly including a slip bowl and a plurality of slips supported on the landing seat,
    a casing string,
    the exterior of said casing string being tightly engaged by said slips so that said slips are in tight supporting engagement therewith,
    an annular adaptor landed on said slip assembly and with an internal recess having lands and grooves on its lower interior immediately surrounding the upper end of said casing string,
    an upper external recess on said adaptor, and
    a metal-to-metal seal assembly positioned within said upper external recess to seal between the exterior of said adaptor and the interior of said housing,
    the upper end of said casing string being cold forged radially outward into tight gripping and sealing engagement with the interior of said internal recess of said adaptor.

15. A wellhead structure according to claim 14 wherein
    said adaptor internal recess includes upper sharp teeth, lower sharp teeth and said lands and grooves are positioned between the upper and lower teeth.

16. A wellhead structure comprising
    a housing,
    a casing string,
    means supporting said casing string with its upper end within said housing,
    an annular adaptor having an internal recess with lands and grooves on its lower interior, an upper external recess and being positioned within said housing with its internal recess immediately surrounding the upper end of said casing string, and
    a metal-to-metal seal assembly positioned within said upper external recess to seal between the exterior of said adaptor, and the interior of said housing, the upper end of said casing string being cold forged radially outward into tight gripping and sealing engagement within the interior of said internal recess of said adaptor.

17. A wellhead structure according to claim 16 wherein
said adaptor internal recess includes upper sharp teeth, lower sharp teeth and said lands and grooves are positioned between the upper and lower teeth.

* * * * *

UNITED STATES PATENT AND TRADEMARK OFFICE
CERTIFICATE OF CORRECTION

PATENT NO. : 4,869,319

DATED : September 26, 1989

INVENTOR(S) : Edward J. Szymczak, et al.

It is certified that error appears in the above—identified patent and that said Letters Patent is hereby corrected as shown below:

On the title page, the first inventor's name is correctly spelled as follows: Edward J. Szymczak.

Signed and Sealed this

Ninth Day of October, 1990

*Attest:*

HARRY F. MANBECK, JR.

*Attesting Officer*      *Commissioner of Patents and Trademarks*